(12) United States Patent
Yoshioka

(10) Patent No.: US 7,051,977 B2
(45) Date of Patent: May 30, 2006

(54) AIRCRAFT WHEEL SUPPORT MECHANISM

(75) Inventor: Koji Yoshioka, 1-19-506, Saidaijiminami-machi, Nara-shi, Nara (JP)

(73) Assignees: Aruze Corporation, Tokyo (JP); Koji Yoshioka, Nara (JP)

( * ) Notice: Subject to any disclaimer, the term of this patent is extended or adjusted under 35 U.S.C. 154(b) by 0 days.

(21) Appl. No.: 10/488,266

(22) PCT Filed: Sep. 5, 2002

(86) PCT No.: PCT/JP02/09026

§ 371 (c)(1),
(2), (4) Date: Mar. 2, 2004

(87) PCT Pub. No.: WO03/022680

PCT Pub. Date: Mar. 20, 2003

(65) Prior Publication Data

US 2004/0195442 A1    Oct. 7, 2004

(30) Foreign Application Priority Data

Sep. 5, 2001    (JP)    ............................. 2001-268869

(51) Int. Cl.
B64C 25/40    (2006.01)
B64C 25/42    (2006.01)
B64C 25/60    (2006.01)

(52) U.S. Cl. .................................................. 244/103 R

(58) Field of Classification Search ............ 244/103 R, 244/104 CS, 104 FP, 104 R
See application file for complete search history.

(56) References Cited

U.S. PATENT DOCUMENTS 2,537,634 A  *  1/1951  Brown ................... 244/103 R
3,345,019 A  *  10/1967  Black et al. ............ 244/100 R
4,561,612 A  *  12/1985  Masclet .................. 244/104 R
4,869,444 A     9/1989  Ralph
6,666,407 B1  *  12/2003  Pancotti .................. 244/102 R

FOREIGN PATENT DOCUMENTS

JP    60-71394    4/1985
JP    63-166699   7/1988

* cited by examiner

*Primary Examiner*—Robert P. Swiatek
(74) *Attorney, Agent, or Firm*—Crowell & Moring LLP

(57) ABSTRACT

An aircraft wheel support mechanism capable of reducing the impact to the tire at the time of landing and capable of reducing the impact to the tire at the time of the wheel colliding with an obstacle lying on the runway. The mechanism has a suspension mechanism for rotatably supporting a wheel by the lower end of a support member connected to the fuselage, the suspension mechanism having a crank shaft assembly. The crank shaft assembly is made up of a horizontal support shaft rotatably supported by the lower end of the support member, an axle for rotatably supporting the wheel, and an arm positioned at right angles with the horizontal support shaft and axle for connecting one end of the horizontal support shaft to one end of the axle.

4 Claims, 9 Drawing Sheets

FIG. 8
(a)
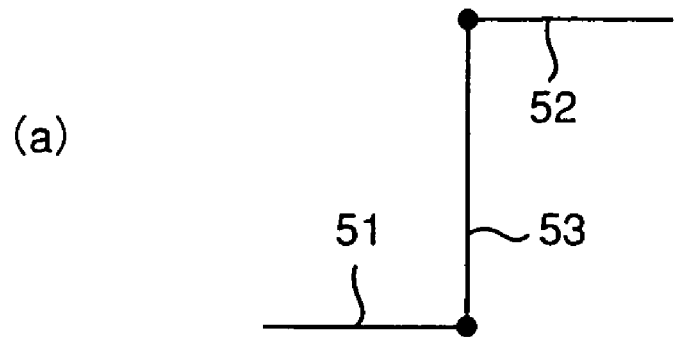
(b)
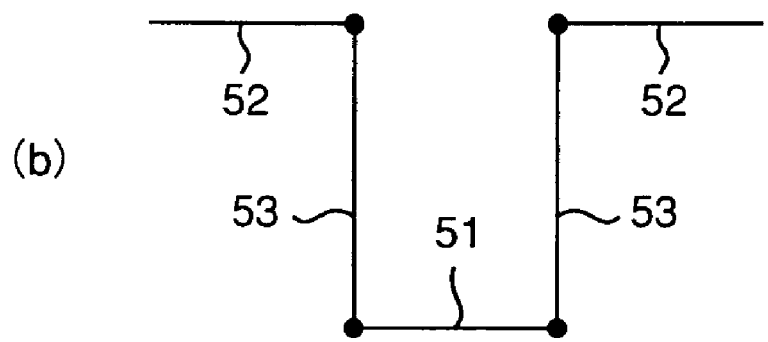
(c)
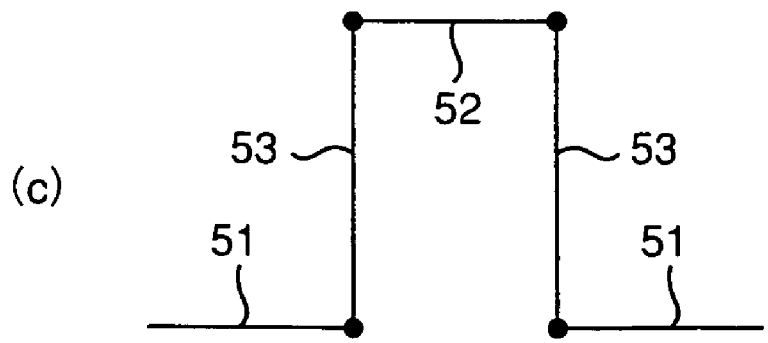

AIRCRAFT WHEEL SUPPORT MECHANISM

FIELD OF THE INVENTION

The present invention relates to a support mechanism for supporting a wheel in an aircraft.

BACKGROUND OF THE INVENTION

In recent years, as shown in FIG. 9, the support mechanism for a wheel in an aircraft has a structure in which kinetic energy of a fuselage 1, caused by a descending speed at the time of landing, is absorbed by using a buffer mechanism 11 for buffering longitudinal movements, such as an oleo-type buffer device. With this structure, an impact force Fg generated on a runway 12 is weakened to Fb and transmitted to the fuselage 1.

SUMMARY OF THE INVENTION (Technical Problems to be Solved by the Invention)

With respect to the aircraft, the velocity of approach to a runway sometimes reaches about 300 km/hour at the time of landing, and a great impact in the horizontal direction is imposed on tires of wheels 13 at the time of landing. This impact is referred to as accelerating impact in dynamical terms. For this reason, as shown in FIG. 9, upon landing, the surface of a tire of a wheel 13 sometimes melts to raise smoke 14. The molten tire material 15 adheres onto the runway 12.

The tire material 15 adhered onto the runway 12 results in degradation in safe aircraft operations. In other words, the following problems are raised.

(1) When it gets wet by rain or the like, the tire material 15 causes slipping of wheels of an aircraft that passes thereon.

(2) The runway 12 sometimes needs to be closed so as to remove the tire material 15 therefrom, and the operation schedule becomes tighter due to the closed runway 12.

Moreover, the molten tire surface tends to cause a flat tire. The flat tire directly impairs the safe aircraft operations. In the event of a flat tire, the runway needs to be temporarily closed, making the operation schedule tighter to cause the subsequent degradation in safe aircraft operations.

Furthermore, recently, a tragic big aircraft accident occurred in which a supersonic aircraft caught a fire upon landing and crashed. It is considered that the cause of this accident was that wheels of the ultrasonic aircraft collide with a metal piece lying on the runway at a high speed to cause a tire to burst and a broken part to smash into a fuel tank or an engine. For this reason, there have been strong demands for mechanisms which can prevent a tire from bursting even when it collides with an obstacle on the runway.

The objective of the present invention is to provide an aircraft wheel support mechanism which can alleviate an impact imposed on the tire at the time of landing, and also alleviate an impact imposed on the tire even when the tire collides with an obstacle lying on the runway.

(Means to Solve the Problems)

In accordance with a first aspect of the present invention which relates to a support mechanism for supporting wheels in an aircraft, the support mechanism is provided with a suspension mechanism for rotatably supporting a wheel by the lower end of a support member connected to the fuselage, and the suspension mechanism has a crank shaft assembly, and in this arrangement, the crank shaft assembly includes a horizontal support shaft rotatably supported by the lower end of the support member, an axle for rotatably supporting the wheel, and an arm positioned at right angles with the horizontal support shaft and axle for connecting one end of the horizontal support shaft to one end of the axle.

In accordance with a second aspect of the present invention that relates to the invention of the first aspect, the suspension mechanism is provided with a control means that controls rotation operations of the horizontal support shaft.

In accordance with a third aspect of the present invention that relates to the invention of the second aspect, before landing, the control means rotates the horizontal support shaft to shift the axle perpendicularly below the horizontal support shaft so that the horizontal support shaft is clamped in this state with the crank shaft assembly standing still, and immediately before landing the clamped state is released.

In accordance with a fourth aspect of the present invention that relates to the invention of the first aspect, a braking mechanism, which carries out a braking operation on the wheel, is prepared, and the braking mechanism carries out the braking operation by pressing a braking face of the wheel with a braking member, and in this arrangement, the braking member is connected to the support member through a link mechanism, and the link mechanism is arranged to maintain a parallel positional relationship with the crank shaft assembly.

(Effects Superior to the Prior Art)

In accordance with the first aspect of the present invention, upon landing, the crank shaft assembly is activated so that the wheel starts to rotate around the axle while being subjected to an angular shift upward in the rear direction around the horizontal support shaft so that, during the angular shift, the weight of the fuselage is not directly imposed on the wheels. Therefore, during the angular shift, that is, during the operation of the crank shaft assembly, it is possible to effectively suppress the tire of the wheel from generating smoke. Moreover, when the axle is positioned perpendicularly above the horizontal support shaft to finish the angular shift, the weight of the fuselage is directly imposed on the wheel; however, at this time, since the wheel has already been made in contact with the runway to rotate thereon, the quantity of slipping of the corresponding wheel at this time is small. Therefore, it is possible to prevent the tire from melting at this time. In other words, in accordance with the invention of the first aspect, it is possible to prevent the tire of the wheel from melting upon landing, and consequently to prevent the molten tire material from adhering to the runway, as well as preventing occurrence of a flat tire due to worn tire. Thus, it becomes possible to improve the safety in the aircraft operations.

Moreover, even when a wheel collides with an obstacle lying on the runway while running thereon, the crank shaft assembly is activated so that the wheel is subjected to an angular shift and released rearward around the horizontal support shaft; thus, it becomes possible to alleviate an impact to be imposed on the wheel. Therefore, it becomes possible to prevent the tire from bursting even when the wheel collides with an obstacle upon running on the runway, and consequently to improve the safety in the aircraft operations from this point of view also.

In accordance with the second aspect of the present invention, during the operations of the crank shaft assembly, the control means imposes a load on the rotation of the horizontal support shaft so that it becomes possible to prevent the crank shaft assembly from excessively vibrating centered on the horizontal support shaft upon running on the runway. Therefore, a stable running operation on the runway is available.

In accordance with the third aspect of the present invention, the crank shaft assembly can be clamped by the control means before landing so that it becomes possible to prevent the crank shaft assembly from vibrating due to strong wind. This ensures stable flight before landing.

In accordance with the fourth aspect of the present invention, even when the crank shaft assembly is activated to subject the wheel to an angular shift around the horizontal support shaft, the braking mechanism is always allowed to carry out braking operations normally.

BRIEF DESCRIPTION OF THE DRAWINGS

FIG. 8 is a schematic view that shows a modified example of a crank shaft assembly.

DETAILED DESCRIPTION OF THE PREFERRED EMBODIMENTS

Figure 1:
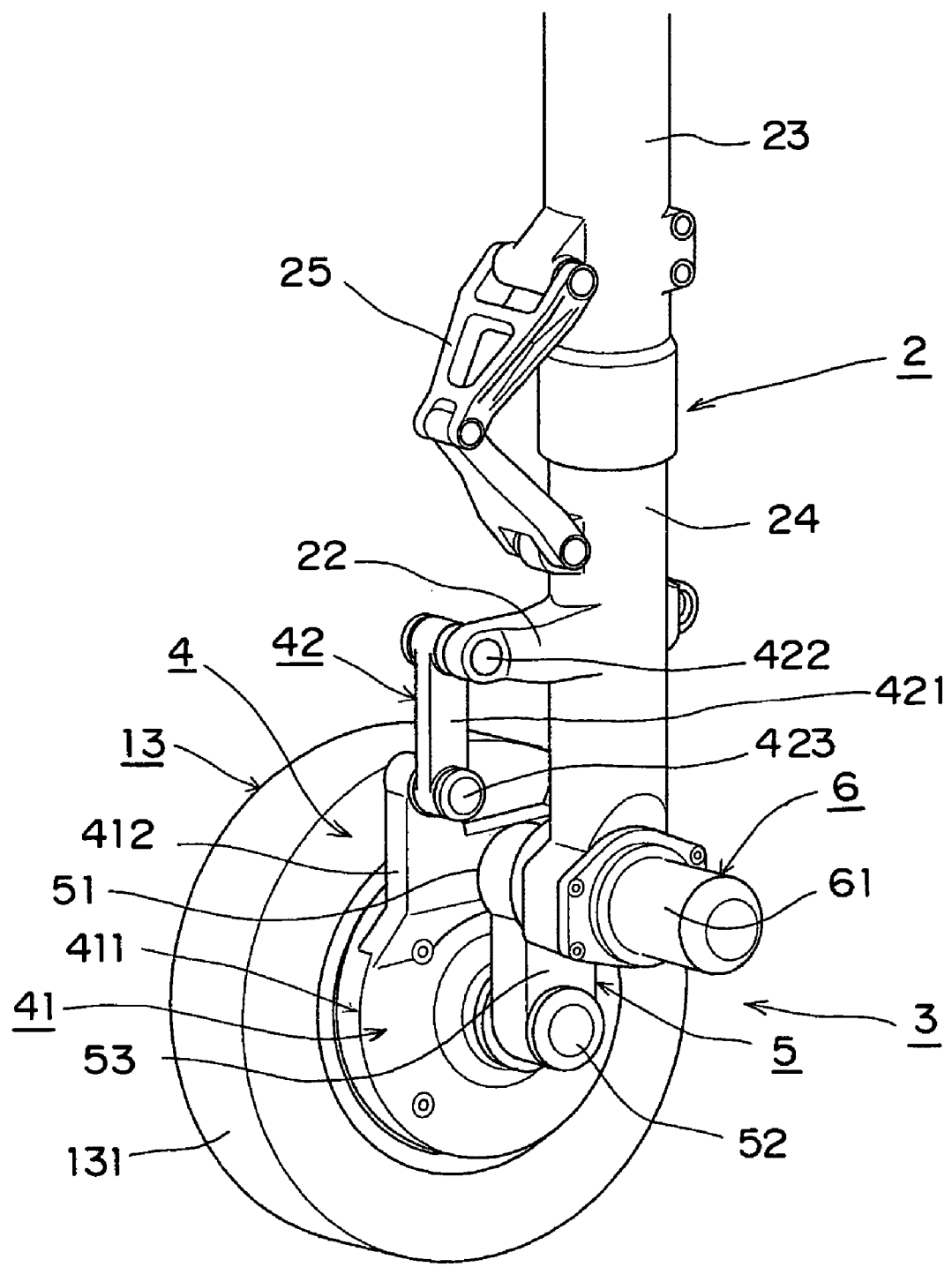
FIG. 1, which is a perspective view that indicates an aircraft wheel support mechanism of the present invention, shows a state before landing.
Figure 2:
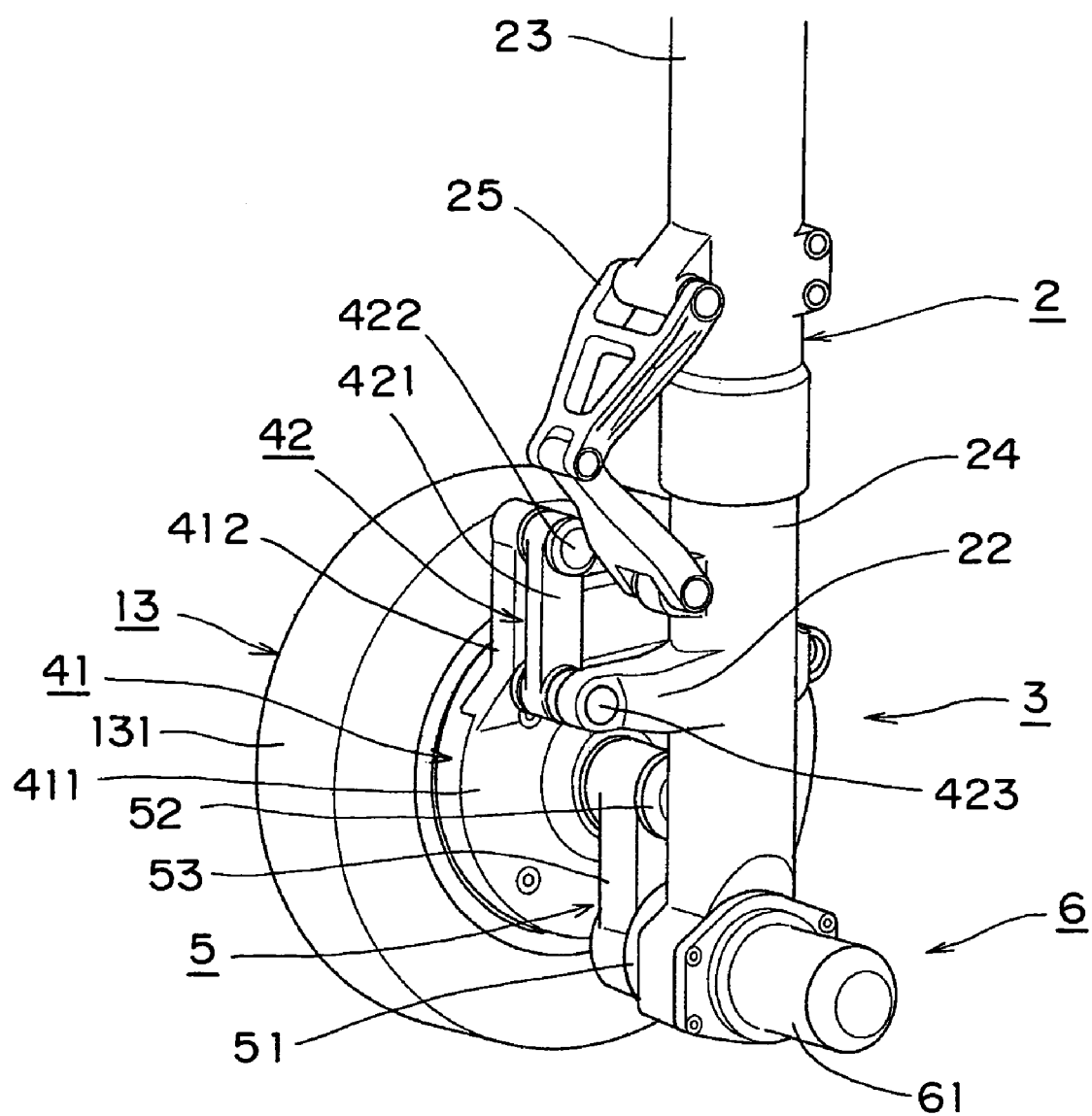
FIG. 2, which is a perspective view that indicates the aircraft wheel support mechanism of the present invention, shows a state after landing.
Figure 3:
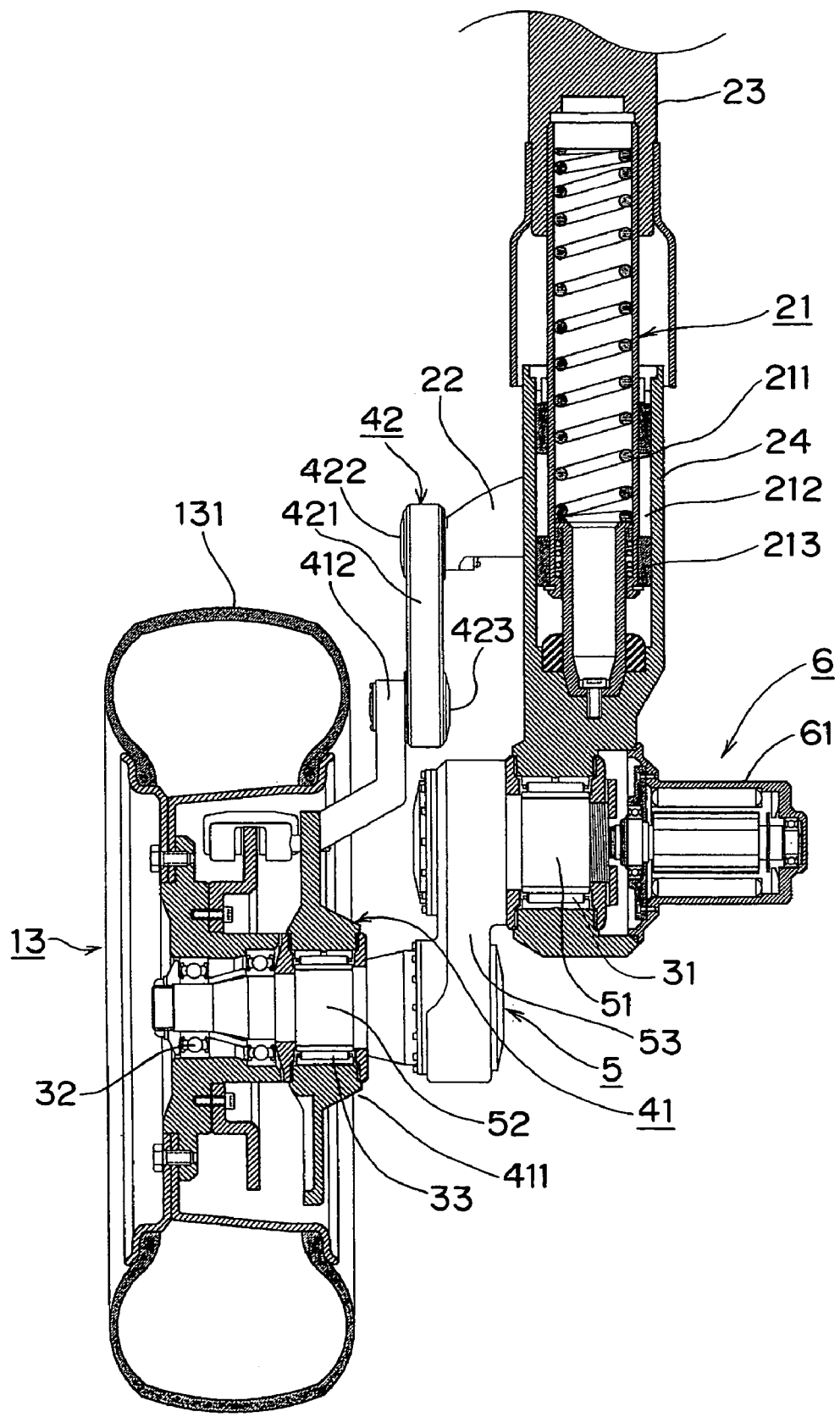
FIG. 3 is a longitudinal cross-sectional view that shows the support mechanism in the state shown in FIG. 1.
Figure 4:
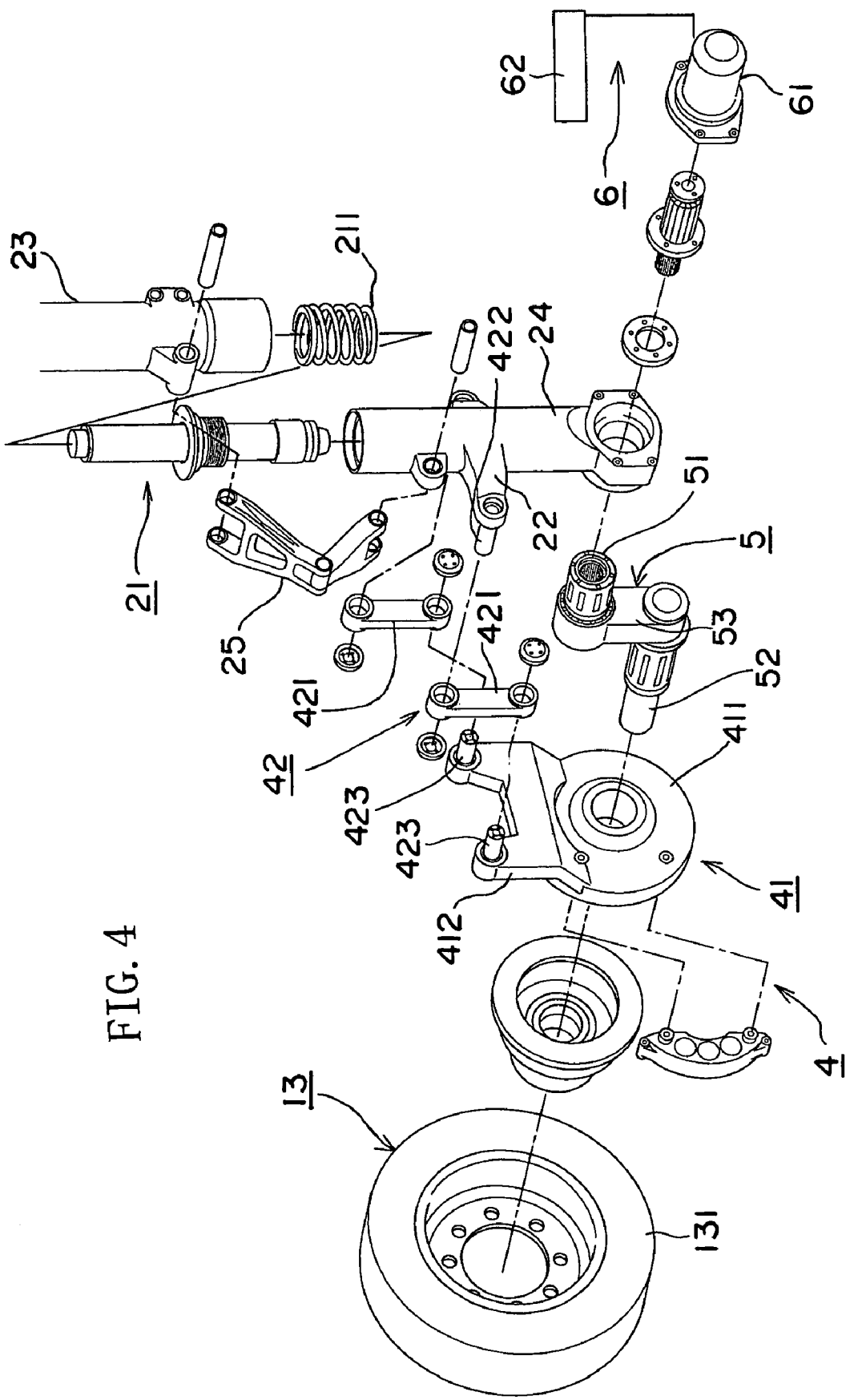
FIG. 4 is an exploded perspective view that shows the aircraft wheel support mechanism of the present invention.

FIGS. 1 and 2 are perspective views that indicate an aircraft wheel support mechanism of the present invention, and FIG. 1 shows a state before landing and FIG. 2 shows a state after landing. FIG. 3 is a longitudinal cross-sectional view that shows the support mechanism in the state shown in FIG. 1. FIG. 4 is an exploded perspective view that shows the support mechanism.

The support mechanism of the present invention is provided with a suspension mechanism 3 and a braking mechanism 4 at the lower end of a support member 2. The suspension mechanism 3 has a crank shaft assembly 5 and a control means 6.

The support member 2 extends downward from the lower portion of a fuselage (not shown). The support member 2 incorporates a buffer mechanism for buffering longitudinal movements, that is, for example, an oleo-type buffer device 21. The oleo-type buffer device 21 is a conventionally known device. As shown in FIG. 3, the oleo-type buffer device 21 has an arrangement in which an elastic force is exerted by a coil spring 211 when it is extended or compressed, while a damping force is exerted when its sealed oil 212 is allowed to pass through an orifice 213.

The crank shaft assembly 5 of the suspension mechanism 3 is provided with a horizontal support shaft 51 that is rotatably supported by the lower end of the support member 2 through a rolling bearing 31, an axle 52 that rotatably supports a wheel 13 through the rolling bearing 31 and an arm 53 that connects one end of the horizontal support shaft 51 to one end of the axle 52. The arm 53 is positioned at right angles with the horizontal support shaft 51 and axle 52. The horizontal support shaft 51 and the axle 52 are located on the side opposite to the arm 53. In FIG. 3, a roller bearing is used as the rolling bearing 31, and a ball bearing is used as the rolling bearing 32.

The control means 6 is comprised of a torque generator 61 and a control unit 62 (FIG. 4). With respect to the torque generator 61, for example, a motor, a dynamo-electric generator or the like may be used. The torque generator 61 controls the rotary torque and rotation angle of the horizontal support shaft 51. The control unit 62 controls operations of the torque generator 61. Moreover, a transmission (not shown) is placed between the torque generator 61 and the horizontal support shaft 51.

The braking mechanism 4 is provided with a disc brake 41 that carries out a braking operation on the wheel 13 by sandwiching a braking rotor (braking face) with pads (braking members). The pads are held in a caliper that is built in a bracket 411. The bracket 411, which is rotatably supported by the axle 52 through the rolling bearing 33, is connected to a protruding portion 22 of the supporting member 2 through a link mechanism 42. The link mechanism 42 has an arrangement in which one end of a link 421 is rotatably connected to the protruding portion 22 through a pin 423, while the other end of the link 421 is rotatably connected to the top end of an extending portion 412 of the bracket 411 through a pin 422 so as to maintain a parallel positional relationship with the crank shaft assembly 5. Here, as shown in FIG. 4, the link mechanism 42 is comprised of two sets of the link 421 and the pins 422 and 423.

As shown in FIGS. 1 through 4, the support member 2 is formed by connecting an upper tube 23 and a bottom tube 24. Reference numeral 25 represents a strut rotation-stopping arm.

The following description will discuss operations of the support mechanism having the above-mentioned arrangement.

Before landing, a signal is sent from the control unit 62 to the torque generator 61 so that the rotation of the horizontal support shaft 51 is controlled by the torque generator 61; thus, the crank shaft assembly 5 is set to an orientation in which the axle 52 is placed perpendicularly below the horizontal support shaft 51, that is, a state as shown in FIG. 1, so that the crank shaft assembly 5 is subjected to a braking force applied to the horizontal support shaft 51, and clamped in this state.

Next, the control unit 62 determines the state immediately before landing based upon a signal from an altitude sensor. Immediately before landing a signal is sent from the control unit 62 to the torque generator 61 so that the braking operation by the torque generator 61 is released, thereby the clamped state of the crank shaft assembly 5 is released.

Figure 5:
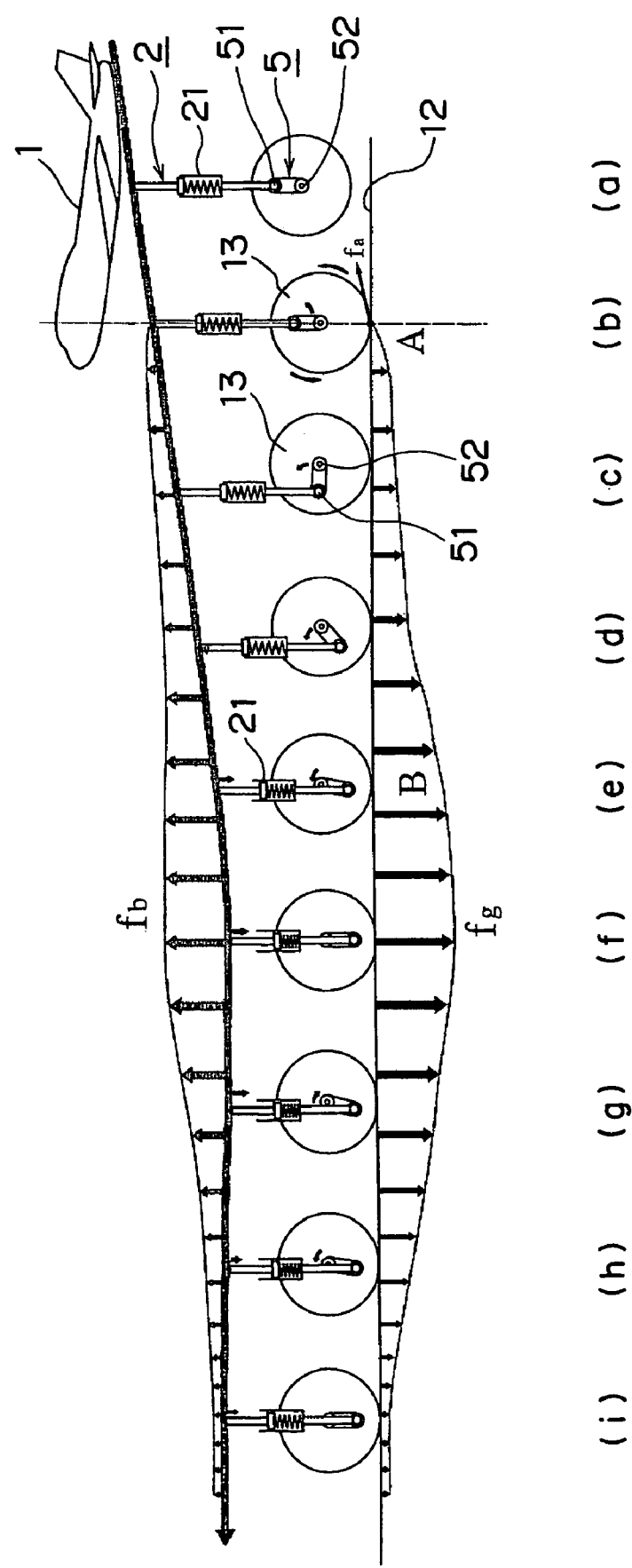
FIG. 5 is a side view that continuously shows landing operations of the aircraft wheel support mechanism of the present invention.

As shown in FIG. 5, the fuselage 1 is then allowed to start landing. Upon landing, the support mechanism having the above-mentioned arrangement carries out the following operations.

FIG. 5(a) shows the support mechanism immediately before the landing. Here, during flight, the wheel 13 is housed inside the fuselage 1 in a state shown in FIG. 2. As shown in FIG. 5(b), when the wheel 13 is made in contact with the runway 12 at point A, an impact force fa is generated in the rear direction. As shown in FIGS. 5(b) to 5(f), the wheel 13 starts rotating around the axle 52 through this impact force, while it is allowed to pivot around the horizontal supporting shaft 51 to start an angular shift upward in the rear direction so that the angular shift is made up to 180 degrees. During this period, the weight of the fuselage 1 is not directly applied onto the wheel 13. The frictional quantity of work W exerted by the wheel 13 while it is in slipping-contact with the runway 12 is represented by the product between the amount of slipping contact S and the load M to be applied to the wheel 13. That is, W=S×M. Consequently, since, during the angular shift, the weight of the fuselage 1 is not directly applied to the wheel 13, the load M is extremely small. Therefore, since the frictional quantity of work W is maintained at a very small value, the tire 131 of the wheel 13 hardly generates smoke.

When the wheel 13 has made an angular shift by 180 degrees around the horizontal supporting shaft 51, the oleo-type buffer device 21 is activated so that, as shown in FIGS. 5(f) to 5(i), the descending energy of the fuselage 1 is absorbed by the buffer device 21; thus, the impact force fg is weakened to fb, and transmitted to the fuselage 1. At this time, the load of the fuselage 1 is directly applied onto the wheel 13; however, since the wheel 13 has already been made in contact with the runway 12 to rotate thereon, the impact in the rear direction is hardly applied to the wheel 13. Consequently, the tire 131 of the wheel 13 hardly generates smoke during these operations. Additionally, the stroke of the buffer device 21 is stopped by oil locking.

After landing, the wheel 13 is allowed to run along the runway 12 in a state shown by FIG. 5(i), that is, in a state shown in FIG. 2. During the running operation, when there is an obstacle lying on the runway 12, the support mechanism having the above-mentioned arrangement carries out the following operations.

Figure 6:
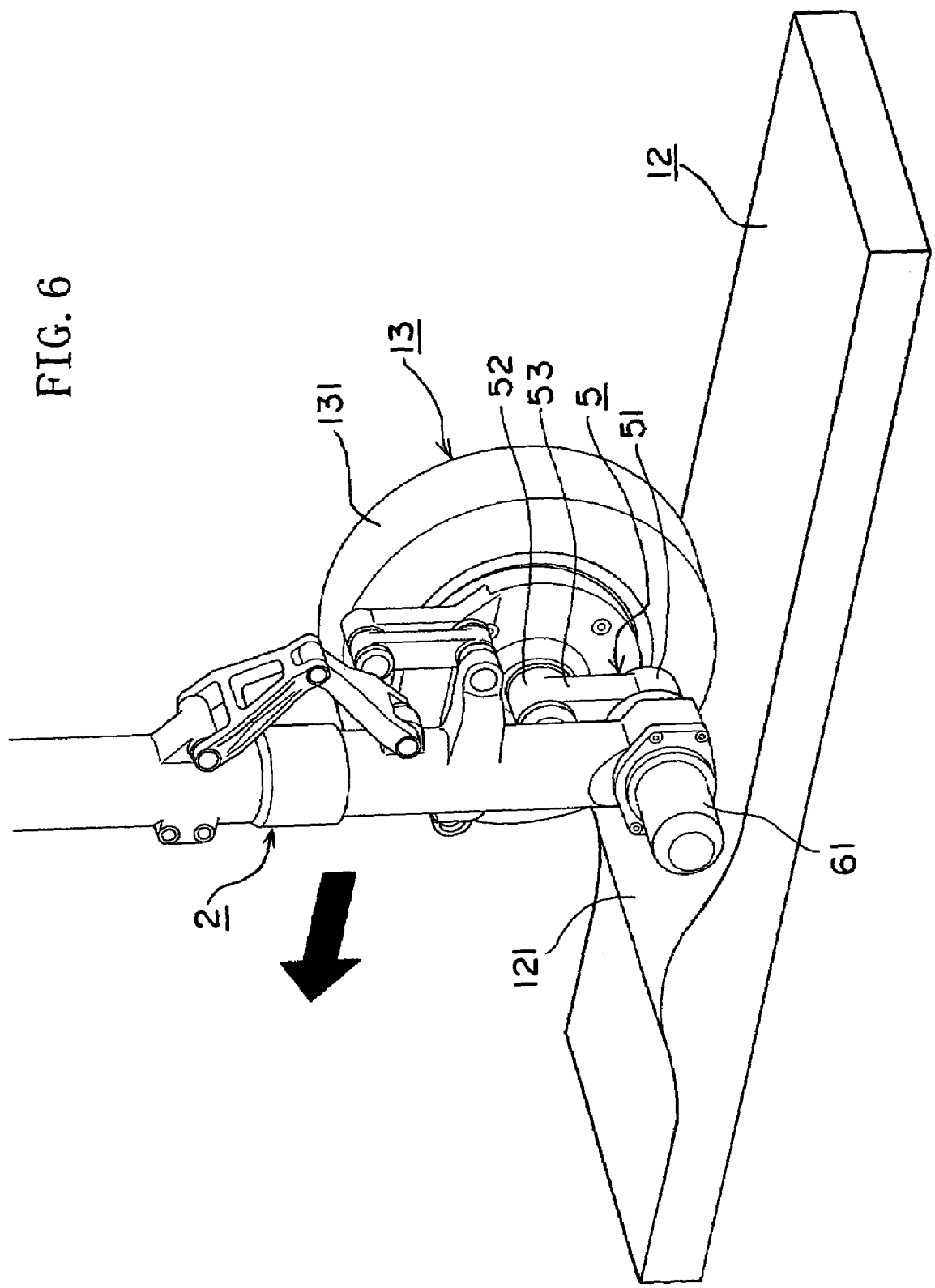
FIG. 6 is a perspective view that shows a normal state of the aircraft wheel support mechanism upon running on the runway.
Figure 7:
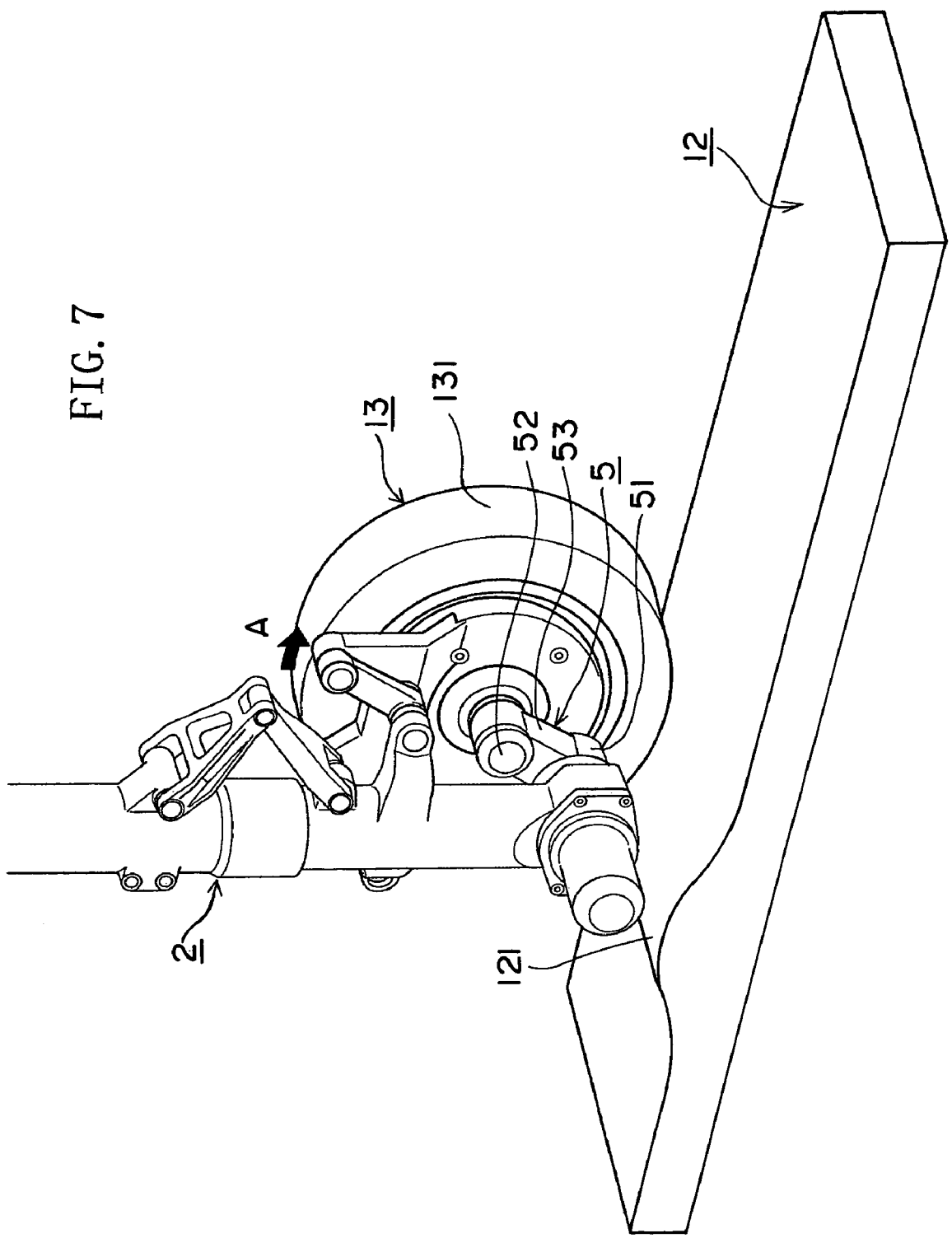
FIG. 7 is a perspective view that shows a state in which the aircraft wheel support mechanism collides with an obstacle upon running on the runway.
Figure 9:
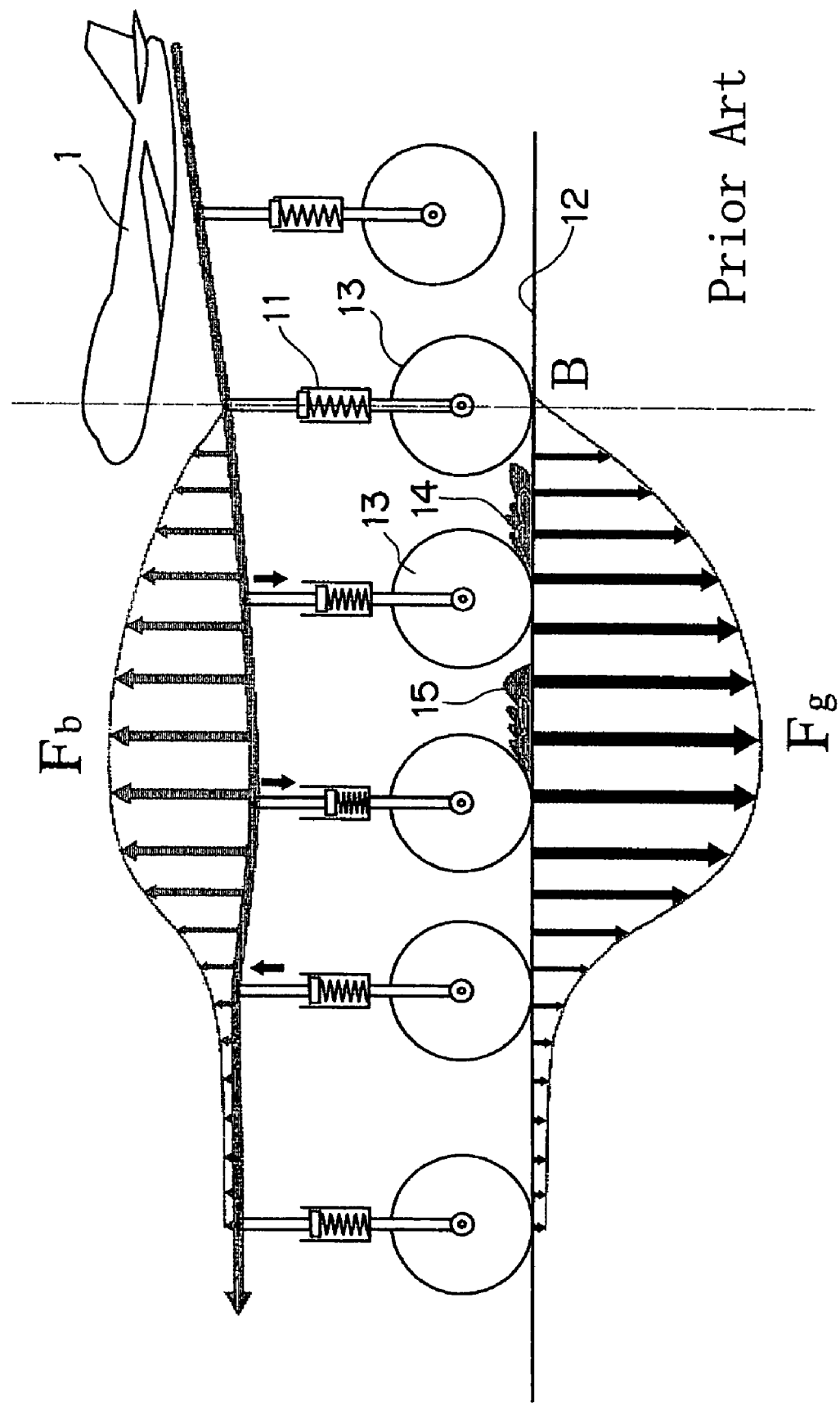
FIG. 9 is a side view that continuously shows landing operations of a conventional aircraft wheel support mechanism.

As shown in FIG. 6, in the case when the wheel 13 is running in the state as shown in FIG. 2 with a protrusion 121 lying on the runway 12, upon running on to the protrusion 121, the wheel 13 is allowed to make an angular shift around the horizontal support shaft 51 as shown in FIG. 7, and released in the rear direction as indicated by arrow A. Thus, an impact applied to the wheel 13 from the front direction is released in the rear direction and alleviated. Moreover, since the wheel 13 is released in the rear direction to make the duration time of the impact to the wheel 13 longer, the instantaneous impact force becomes weaker. Therefore, even when, upon running on the runway, the wheel 13 collides with an obstacle, the impact applied to the wheel 13 becomes smaller so that it is possible to prevent the tire 131 from bursting.

Moreover, when the wheel 13 makes an angular shift around the horizontal support shaft 51, the link mechanism 42 of the braking mechanism 4 is operated in the following manner.

In FIG. 2, the link mechanism 42 is allowed to maintain a parallel positional relationship with the crank shaft assembly 5; therefore, when the wheel 13 makes an angular shift around the horizontal support shaft 51, the link mechanism 42 is operated while maintaining the parallel positional relationship with the operations of the crank shaft assembly 5. When, as shown in FIG. 2, the crank shaft assembly 5 is shifted to a position at which the axle 52 is located perpendicularly above the horizontal support shaft 51, the link mechanism 42 is shifted to a position at which the pin 423 is located perpendicularly above the pin 422. Therefore, even when the wheel 13 makes an angular shift around the horizontal support shaft 51, the disc brake 41 of the braking mechanism 4 is always maintained in a state that allows normal operations.

In the supporting mechanism having the above-mentioned arrangement, the following effects are obtained:

(1) Since the wheel 13 is supported by the suspension mechanism 3 having the crank shaft assembly 5 at the lower end of the support member 2 and since, upon landing, the crank shaft assembly 5 is operated as shown in FIG. 5, it becomes possible to effectively prevent the tire 131 of the wheel 13 from generating smoke.

(2) Even in the case when, upon running, the wheel 13 collides with an obstacle (protrusion 121) on the runway 12, the crank shaft assembly 5 is operated as shown in FIG. 7, it becomes possible to alleviate an impact onto the wheel 13, and consequently to prevent the tire 131 from bursting.

(3) Since the control means 6, which controls the rotation operation of the horizontal support shaft 51, can apply a load onto the rotation of the horizontal support shaft 51 during the angular shift and running of the wheel 13, it is possible to prevent the crank shaft assembly 5 from vibrating centered on the horizontal support shaft 51.

(4) Since, before landing, the crank shaft assembly 5 is clamped by the control means 6 in a state as shown in FIG. 1, it is possible to prevent the crank shaft assembly 5 from vibrating due to strong wind.

(5) The link mechanism 42 is arranged so as to maintain a parallel positional relationship with the crank shaft assembly 5; therefore, even when the shaft 13 makes an angular shift around the horizontal support shaft 51, it is possible to always maintain the disc brake 41 of the braking mechanism 4 in a normal operable state.

(6) Since a transmission is installed between the torque generator 61 and the horizontal support shaft 51, the torque to be applied to the horizontal support shaft 51 is increased by the transmission. Therefore, it becomes possible to make the torque generator 61 smaller and light-weight.

(7) In the case when the crank shaft assembly 5 is manufactured by using carbon fibers, it becomes possible to make the crank shaft assembly 5 lighter and also to increase the impact alleviating function of the crank shaft assembly 5.

Additionally, the crank shaft assembly 5 having the above-mentioned arrangement has a schematic structure as shown in FIG. 8(a), and may have a structure as shown in FIG. 8(b) or 8(c). In FIG. 8(b), axles 52 are located on both sides of the horizontal support shaft 51 through an arm 53. In FIG. 8(c), horizontal support shafts 51 are located on both sides of the axle 52.

What is claimed is:

1. An aircraft wheel support mechanism comprising:
a suspension mechanism for rotatably supporting a wheel by the lower end of a support member connected to a fuselage,
wherein the suspension mechanism has a crank shaft assembly, and the crank shaft assembly comprises a horizontal support shaft that is rotatably supported by the lower end of the support member,
an axle for rotatably supporting the wheel and having a longitudinal axis parallel to a longitudinal axis of the horizontal support shaft, and
an arm which is positioned at right angles with the horizontal support shaft and axle, wherein the arm connects one end of the horizontal support shaft to one end of the axle and wherein the arm is shorter than a radius of the wheel, and the axle is capable of making an angular shift around the horizontal support shaft and is capable of being located perpendicularly below and above the horizontal support shaft in such a way that the longitudinal axes of the axle and the horizontal support shaft are perpendicular to a longitudinal axis of the arm.

2. The aircraft wheel support mechanism according to claim 1, wherein the suspension mechanism comprises a control means that controls rotation operations of the horizontal support shaft.

3. The aircraft wheel support mechanism according to claim 2, wherein before landing of the aircraft, the control means controls a torque generator to rotate the horizontal support shaft to shift the axle perpendicularly below the horizontal support shaft so that the horizontal support shaft is clamped in this state with the crank shaft assembly standing still, and immediately before landing the control means controls the torque generator to release the clamped state.

4. An aircraft wheel support mechanism comprising:

a suspension mechanism for rotatably supporting a wheel by the lower end of a support member connected to a fuselage, wherein the suspension mechanism has a crank shaft assembly, and the crank shaft assembly comprises a horizontal support shaft that is rotatably supported by the lower end of the support member, an axle for rotatably supporting the wheel, and an arm positioned at right angles with the horizontal support shaft and axle for connecting one end of the horizontal support shaft to one end of the axle; and a braking mechanism that carries out a braking operation on the wheel, wherein the braking mechanism carries out the braking operation by pressing a braking face of the wheel with a braking member, and the braking member is connected to the support member through a link mechanism and the link mechanism is arranged to maintain a parallel positional relationship with the crank shaft assembly.

* * * * *